United States Patent
Mittel (10) Patent No.: US 11,396,315 B1
(45) Date of Patent: Jul. 26, 2022

(54) COLLAPSIBLE CART

(71) Applicant: Lisa Mittel, San Antonio, TX (US)

(72) Inventor: Lisa Mittel, San Antonio, TX (US)

( * ) Notice: Subject to any disclaimer, the term of this patent is extended or adjusted under 35 U.S.C. 154(b) by 0 days.

(21) Appl. No.: 17/369,683

(22) Filed: Jul. 7, 2021

(51) Int. Cl.
*B62B 3/02* (2006.01)
*B62B 5/06* (2006.01)
*B62B 3/14* (2006.01)

(52) U.S. Cl.
CPC .............. *B62B 3/027* (2013.01); *B62B 3/022* (2013.01); *B62B 3/1476* (2013.01); *B62B 3/1496* (2013.01); *B62B 5/067* (2013.01); *B62B 2202/12* (2013.01); *B62B 2205/20* (2013.01)

(58) Field of Classification Search
CPC ......... B62B 5/067; B62B 3/027; B62B 3/025; B62B 3/022; B62B 3/02; B62B 2205/20; B62B 2205/30; B62B 3/1476; B62B 1/12
See application file for complete search history.

(56) References Cited

U.S. PATENT DOCUMENTS

| | | | | |
|---|---|---|---|---|
| 2,133,834 A * | 10/1938 | Sheldon | ................. | B62B 3/1464 280/47.35 |
| 3,326,571 A * | 6/1967 | Levine | .................... | B62B 3/027 280/641 |
| 4,047,724 A * | 9/1977 | Shaffer | ................... | B62B 1/002 280/5.22 |
| 4,274,644 A * | 6/1981 | Taylor | ....................... | B62B 3/02 280/39 |
| 4,659,096 A * | 4/1987 | Leimgruber | .............. | B62B 3/02 280/39 |
| 5,228,716 A * | 7/1993 | Dahl | ....................... | B62B 1/002 280/47.18 |
| 5,348,325 A * | 9/1994 | Abrams | .................... | B62B 1/12 280/40 |
| 5,476,282 A * | 12/1995 | Dahl | ....................... | B62B 1/002 280/47.18 |
| 5,507,507 A * | 4/1996 | Davidson | .............. | B62B 3/1464 280/33.991 |
| 5,553,877 A * | 9/1996 | Huang | .................... | B62B 3/144 446/268 |
| 6,082,757 A * | 7/2000 | Lin | ......................... | A01K 97/22 280/654 |
| 6,394,471 B1 * | 5/2002 | Watson | .................... | B62B 1/12 280/47.19 |
| 7,168,715 B1 * | 1/2007 | Friedman | ............... | B62B 3/006 280/33.991 |

(Continued)

*Primary Examiner* — Emma K Frick
(74) *Attorney, Agent, or Firm* — Roman Aguitera, III (57) ABSTRACT

The present invention discloses a collapsible cart with a base panel and basket support frame. Two hinge mounts extend from the base frame and a hinge pin extends from each hinge mount. The basket support frame has two support beams that are slidably and rotatable mounted on the hinge pins. Each hinge mount forms a receiving space that can receive and block rotation of each support beam. A cable made of flexible material mounts between the two support beams. When a downward or upward force is exerted on the cable, each end of the cable pulls the support beams towards each other along the longitudinal axis of the hinge pin causing the support beams to move into a position which is clear of the receiving space and allows rotation around the hinge pins towards the base panel and into a collapsed position.

22 Claims, 9 Drawing Sheets

(56) References Cited

U.S. PATENT DOCUMENTS

| | | | | |
|---|---|---|---|---|
| 7,392,992 B2* | 7/2008 | Stone | ............... | B62B 1/125 224/411 |
| 7,500,681 B2* | 3/2009 | Steadman | ............... | B62B 1/14 280/47.131 |
| 7,566,069 B1* | 7/2009 | Ortega | ............... | B62B 3/027 280/32.6 |
| 7,588,257 B2* | 9/2009 | Gu | ............... | B62B 3/16 280/32.6 |
| 7,703,776 B1* | 4/2010 | Nugent | ............... | B62B 1/14 280/47.26 |
| 7,784,816 B2* | 8/2010 | Jian | ............... | B62B 3/02 280/651 |
| 7,954,830 B2* | 6/2011 | Begin | ............... | B62B 3/04 280/47.35 |
| 8,342,544 B1* | 1/2013 | Blewett | ............... | B62B 3/022 280/79.11 |
| 8,844,949 B2* | 9/2014 | White | ............... | B62B 3/027 280/38 |
| 9,050,988 B1* | 6/2015 | McLeod | ............... | B62B 3/022 |
| 9,085,314 B2* | 7/2015 | Selvig | ............... | B62B 3/1476 |
| 9,090,276 B1* | 7/2015 | Ihrke | ............... | B62B 3/027 |
| 9,598,097 B2* | 3/2017 | Sherman | ............... | B62B 3/1492 |
| 9,751,549 B2* | 9/2017 | McClanahan | ............... | B62B 3/02 |
| 10,086,860 B2* | 10/2018 | Jian | ............... | B62B 5/067 |
| 10,118,634 B2* | 11/2018 | Wang | ............... | B62B 5/067 |
| 10,479,386 B2* | 11/2019 | Duru | ............... | B62B 3/022 |
| 10,486,724 B2* | 11/2019 | Dardashti | ............... | B62B 3/005 |
| 10,589,767 B2* | 3/2020 | Bacallao | ............... | B62B 5/0485 |
| 2005/0012286 A1* | 1/2005 | Woodrow | ............... | B62B 3/148 280/47.35 |
| 2007/0096437 A1* | 5/2007 | Watson | ............... | B62B 3/106 280/651 |
| 2007/0114764 A1* | 5/2007 | Giampavolo | ............... | B62B 3/144 280/652 |
| 2009/0058025 A1* | 3/2009 | Rolim De Oliveira | .. | A45C 3/04 206/509 |
| 2014/0084036 A1* | 3/2014 | Hemann | ............... | B62B 5/00 224/411 |

* cited by examiner

COLLAPSIBLE CART

CROSS-REFERENCES TO RELATED APPLICATIONS

Not Applicable

STATEMENT REGARDING FEDERALLY SPONSORED RESEARCH OR DEVELOPMENT

Not applicable.

BACKGROUND OF THE INVENTION

1. Field of the Invention

The present invention relates generally to a portable and collapsible shopping cart with detachable baskets.

2. Background of Related Art

Generally, when a person shops in a grocery store, department store, or other retail establishments where customers self-select numerous goods to purchase, customers use a shopping cart to transport the goods around the store and to the customer's vehicle. Retailers provide the shopping carts to customers and are responsible for maintaining and cleaning the shopping carts.

Due to the spread of infectious diseases that can lead to epidemics and pandemics, it has become increasingly important for retailers to clean the shopping carts between users so as to ensure the safety of their customers and to help stop the spread of infectious diseases. Retailers are expending additional resources to keep up with these cleaning demands. A personal, portable, and collapsible shopping cart allows customers to bring their own shopping cart to retail establishments, which helps stop the spread of infectious diseases and reduces retailer's cleaning demands.

There are existing collapsible shopping carts that have limitations and issues. For example, some collapsible carts are too bulky to transport in most user's vehicles. Other collapsible carts are too small and capable of carrying only a limited number of goods. Thus, there is a need for improvement of the current technology. The present invention improves these deficiencies.

SUMMARY OF THE INVENTION

The present invention discloses a personal, portable, and collapsible cart for multiple uses, including but not limited to, use at retail establishments and place where utility carts are used. The cart has a base panel which comprises an outer perimeter frame, a base surface, and caster wheel attachments. The outer perimeter frame has a front end, back end, and two sides all positioned generally parallel to a grounding surface. The base surface rests on and is connected to the outer perimeter frame and is shaped to correspond with the shape of the outer perimeter frame. The caster wheel attachments mount onto the base surface. The caster wheels are positioned below the base frame and mount to the caster wheel attachments.

Two hinge mounts connect to and extending from the back end of the outer perimeter frame of the base panel. A hinge pin is connected to and extending from each hinge mount. A basket support frame is slidably and rotatably mounted on the hinge pins and comprises of two support beams, a cart handle, a cable, and a plurality of basket mounting hooks. The two support beams are positioned generally parallel to each other and comprise of a first end, second end, two cable openings, and two hinge openings. The cart handle has a generally square U-shape and extends from the first ends of the support beams. The cable is made of a flexible material and mounts between the two support beams. The plurality of basket mounting hooks extend from the support beams and are shaped and positioned to receive a basket thereon.

Each hinge mount has a first wall, second wall, and third wall, which forms a receiving space. The two hinge mounts are positioned such that the receiving space of each hinge mount receives, at least partially, the second end of a support beam of the basket support frame when the basket support frame is in a vertical position. The hinge pins connect to and extend from the second wall of each hinge mount through the receiving space. The support beams of the basket support frame slidably and rotatably mount to the hinge pins by positioning the hinge pins through the hinge openings of the support beams. The second end of the support beams slide along the longitudinal axis of the hinge pins and the support beams rotate in a plane that is perpendicular to the longitudinal axis of the hinge pins.

Each basket has a top frame, front wall, back wall, two side walls, bottom side, interior cavity, two support members, and two basket handles. When the basket support frame is in the upright position each basket can mount onto the basket support frame by sliding the top frame of the basket onto the basket mounting hooks connected to each support beam of the basket support frame. Each support member has a first arm and second arm. When the basket is mounted onto the basket support frame, the first of each support member is positioned adjacent to the interior side of each mounting hook such that the first arm of each support member of the basket blocks the corresponding support beam from sliding along the longitudinal axis of the hinge pins. The support members of each basket abut against the basket support frame and support the basket in a level position when mounted to the basket support frame. The two basket handles rotatably mount onto the top frame of the basket member and allow users to detach and remove the basket member from the basket support frame.

When the basket support frame is in the upright position, the support beams are positioned parallel to each other with the second end of the support beams positioned, at least partially, within the receiving space of the hinge mounts, and the first and third walls of the hinge mounts block the rotation of the support beam around the hinge pin. When a downward or upward force is exerted on the cable of the basket support frame, each end of the cable pulls the second ends of the support beams towards each other along the longitudinal axis of the hinge pin and away from the second wall of the hinge mounts, which causes the second end of the support beams to move into a position which is clear of the receiving space. In this position, the support beams may rotate around the hinge pins towards the base surface of the base panel and into a collapsed position.

A latch secures the basket support frame in the collapsed position. The latch is rotatably mounted onto the base surface of the base panel. When the basket support frame is in the collapsed position the latch can be rotated from an unlocked position to a locked position where the latch locks the support beams to the base frame. When the latch rotates from the locked position into the unlocked position, the support beams may rotate from the collapsed position to the upright position, and then the second end of the support beams may be positioned within the receiving space of the hinge mounts.

DETAILED DESCRIPTION

As shown in FIGS. 1-4, a collapsible cart 10 shown in the upright position has a base panel 20, caster wheels 40, hinge mounts 50, hinge pins 60, basket support frame 70, baskets 90, basket mounting hooks 78, and a latch 45. The base panel 20 comprises an outer perimeter frame 27, base surface 21, and caster wheel attachments 35. The outer perimeter frame 27 is a continuous frame with a front end 23, back end 24, and two sides 25 and is positioned generally parallel to a resting surface. In the preferred embodiment, the outer perimeter frame 27 has a generally parabolic shape with a curved front end 23 and flat back end 24. The base surface 21 rests on the outer perimeter frame 27 and is generally flat with a top side 26 and bottom side 22. The base surface 21 is shaped to correspond with the shape of the outer perimeter frame 27. In the preferred embodiment, the base surface 21 is composed of a plurality of rods 28 positioned across the width of the base panel 20 and a plurality of rods 29 positioned perpendicular to the rods 28 and across the depth of the base panel 20 such that the rods 28, 29 form a lattice pattern. The ends of the rods 28, 29 mount onto the outer perimeter frame 27. Preferably the rods 28, 29 are metal and welded to the outer perimeter frame 27 which is also metal. However, it is envisioned that other materials and means of connection may be used.

The caster wheel attachments 35 mount onto the bottom side 22 of the base surface 21. In the preferred embodiment, the caster wheel attachment is a metal plate that is welded to the base surface 21. The caster wheels 40 are an industry standard caster wheel positioned below the base frame 20. Each caster wheel 40 mount to a caster wheel attachment 35 and is secured with a bolt. In the preferred embodiment, there are four caster wheel attachments 35 and four caster wheels 40.

As shown in FIGS. 1-8, the basket support frame 70 is comprised of two support beams 72 each having a first end 82 and second end 84 and a generally square U-shaped cart handle 74 extending from the first ends 82 of the support beams 72. The two support beams 72 are elongated, hollow, cylindrical members positioned generally parallel to each other. Two hinge openings 89 through the wall of support beams 72 are positioned at or near the second end 84 of each support beam 72. The hinge openings 89 in each support beam 72 are positioned on opposite sides of the support beam 72 and are preferably circular in shape. Two cable openings 88 through the wall of the support beam 72 are also positioned near the second end 84 of each support beam 72 but between the hinge openings 89 and the first end 82 of each support beam 72. The cable openings 88 in each support beam 72 are positioned on opposite sides of the support beam 72 and are also preferably circular in shape. Preferably, the cart handle 74 extends from the first ends 82 of support beams 72 such that the cart handle 74 is positioned at a rearward angle from the support beams 72. In this manner, the cart handle 74 allows users to easily control the movement and direction of the collapsible cart 10.

Still referring to FIGS. 1-8, the second end 84 of each support beam 72 of the basket support frame 70 is connected to hinge mount 50 with a hinge pin 60. The hinge mounts 50 are connected to and extend from opposite ends of the back end 24 of the outer perimeter frame 27 of the base panel 20. The hinge mounts 50 are preferably elongated square U-shaped members comprising of a first wall 51, a second wall 52, and a third wall 53, which form a receiving space 55. The first wall 51 and third wall 53 extend from and are generally perpendicular to the second wall 52 and the first wall 51 is generally parallel to the third wall 53. The second wall 52 comprises an interior surface 58 which has a width that is slightly larger than the diameter of a support beam 72. Preferably, the width of the first wall 51 and third wall 53 is at least greater than half of the diameter of the support beam 72. The receiving space 55 is generally sized to receive the support beam 72 therein.

The third wall 53 of each hinge mount 50 mounts to the back end 24 of the outer perimeter frame 27 of the base panel 20 and extends upward therefrom such that the hinge mount 50 is positioned generally 90 degrees from the base surface 21. Each of the hinge mounts 50 are positioned such that the interior surfaces 58 of the second walls 52 face towards each other.

Each hinge pin 60 consists of a non-threaded cylindrical shaft 61 and a cap 65 with a lip 63 positioned at one end of the shaft 61. The length of the shaft 61 (excluding the cap 65) is at least twice the diameter of the support beam 72 and the shaft 61 diameter is slightly smaller than the diameter of the hinge openings 89 of the support beam 72. The lip 63 has a diameter larger than the diameter of the hinge openings 89 of the support beam 72. The end of each hinge pin 60 opposite the cap 65 is connected to and extends from the interior surface 58 of the second wall 52 of each hinge mount 50 and through and out of the receiving space 55. The longitudinal axis of each hinge pin 60 is positioned generally 90 degrees from the second wall 52 of each hinge mount 50 and generally parallel to the back end 24 of outer perimeter frame 27 of the base frame 20. The cap 65 of each of the hinge pins 60 is positioned at the end of each hinge pin 60 opposite the end connected to the second wall 52 of the hinge mount 50. Preferably, the hinge pins 60 are connected to the second wall 52 of a hinge mount 50 with a weld.

Each of the support beams 72 of the basket support frame 70 are slidably and rotatably mounted on one of the hinge pins 60 by positioning the corresponding hinge pin 60 through the hinge openings 89 of the corresponding support beam 72. In this manner, the second end 84 of each of the support beams 72 can slide along the longitudinal axis of the corresponding hinge pin 60 and each of the support beams 72 can rotate in a plane that is perpendicular to the longitudinal axis of the hinge pins 60. The lip 63 of the cap 65 of each hinge pin 60 acts as a stop and prevents the corresponding support beam 72 from sliding off the hinge pin 60.

In the preferred embodiment, as seen in FIGS. 1-4, baskets 90 are mounted on the support frame 70. Each basket 90 is a generally rectangular shaped container having a rectangular top frame 98, two side walls 91, a front wall 92, a back wall 94, a bottom side 95, a top end 100, an interior cavity 102, two support members 105, and two basket handles 85. The top end 100 of the basket 90 is open. A plurality of generally square U-shaped rods 125 are attached to the top frame 98 with the ends of each U-shaped rod 125 attached to the top frame 98 at opposite sides of the top frame 98. In this manner, the plurality of U-shaped rods 125 form the side, front, and back walls 91, 92, 94 and the bottom side 95 of the basket 90. The U-shaped rods 125 that form the side walls 91 overlap with and are positioned perpendicular to a portion of the U-shaped rods 125 that form the front wall 92 and back wall 94 such that they form a lattice pattern at the bottom side 95 of the basket 90. Each of the U-shaped rods 125 is shaped such that the side, front and back walls 91, 92, 94 each angle slightly inwards. When the basket support frame 70 is in the upright position the basket 90 can mount onto the basket support frame 70 by mounting the top frame 98 of the basket 90 onto the basket mounting hooks 78 on the support beams 72 of the basket support frame 70.

Figure 1:
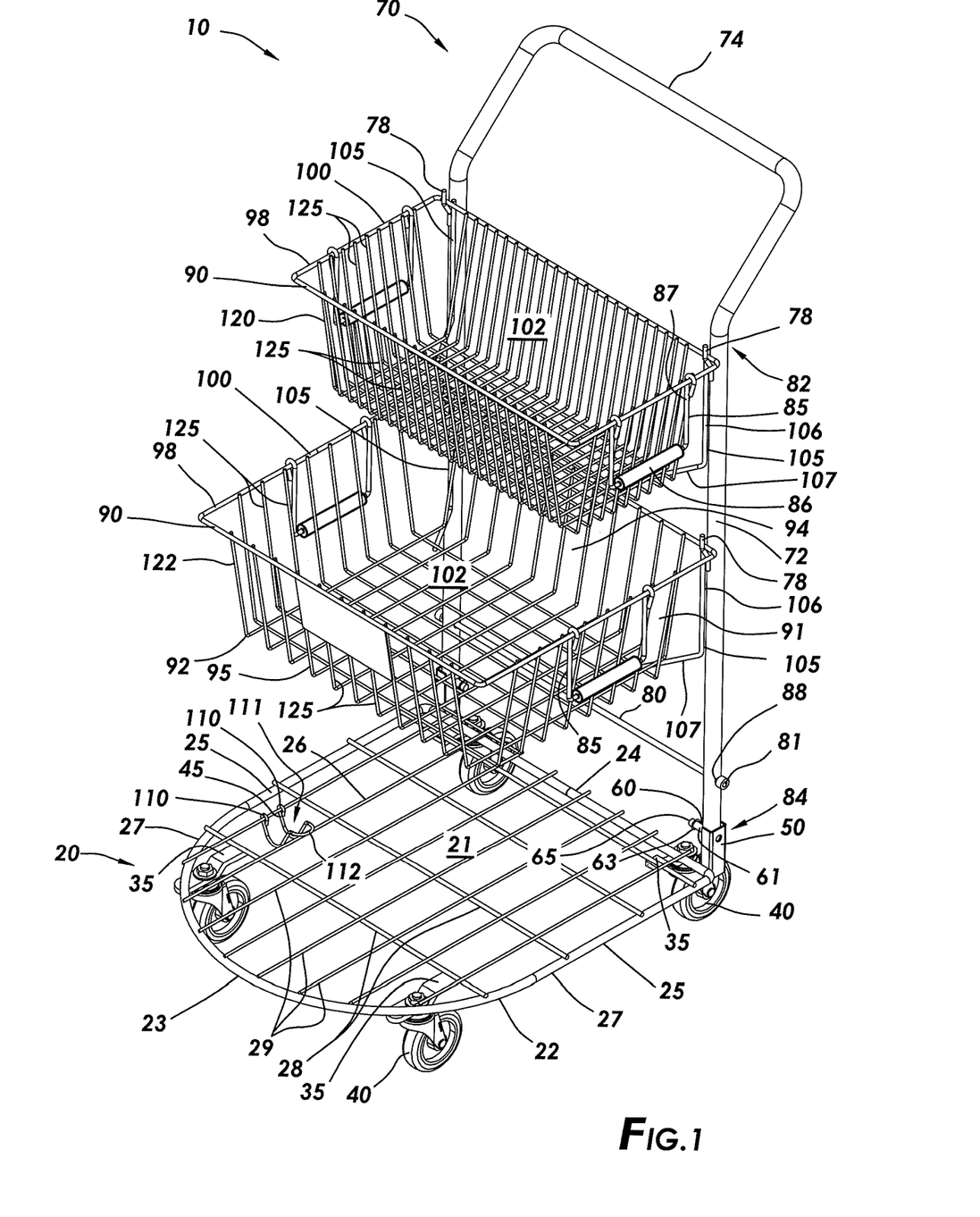
FIG. 1 is perspective view of the preferred embodiment of the present invention.
Figure 2:
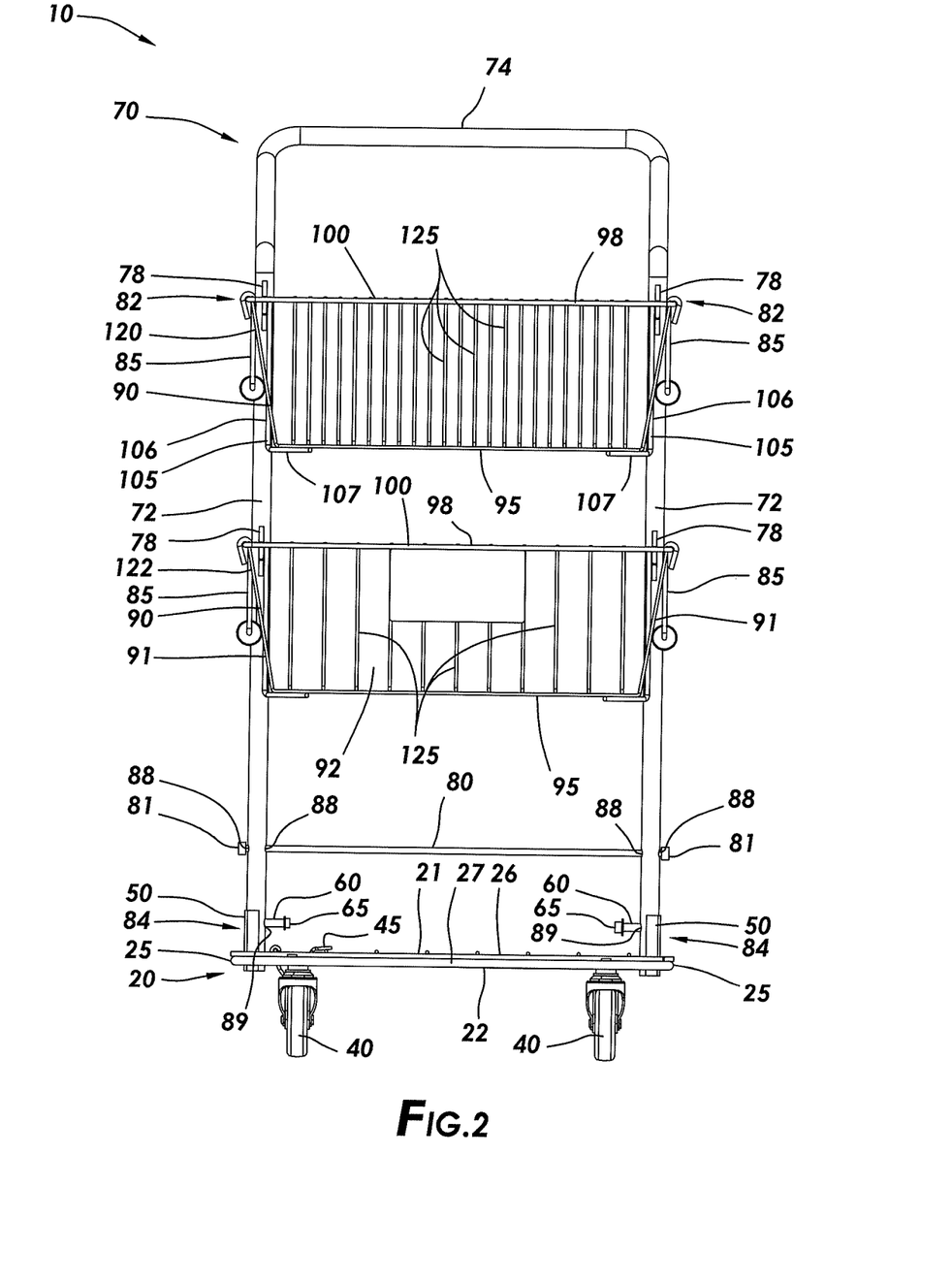
FIG. 2 is a front view of the preferred embodiment of the present invention.
Figure 3:
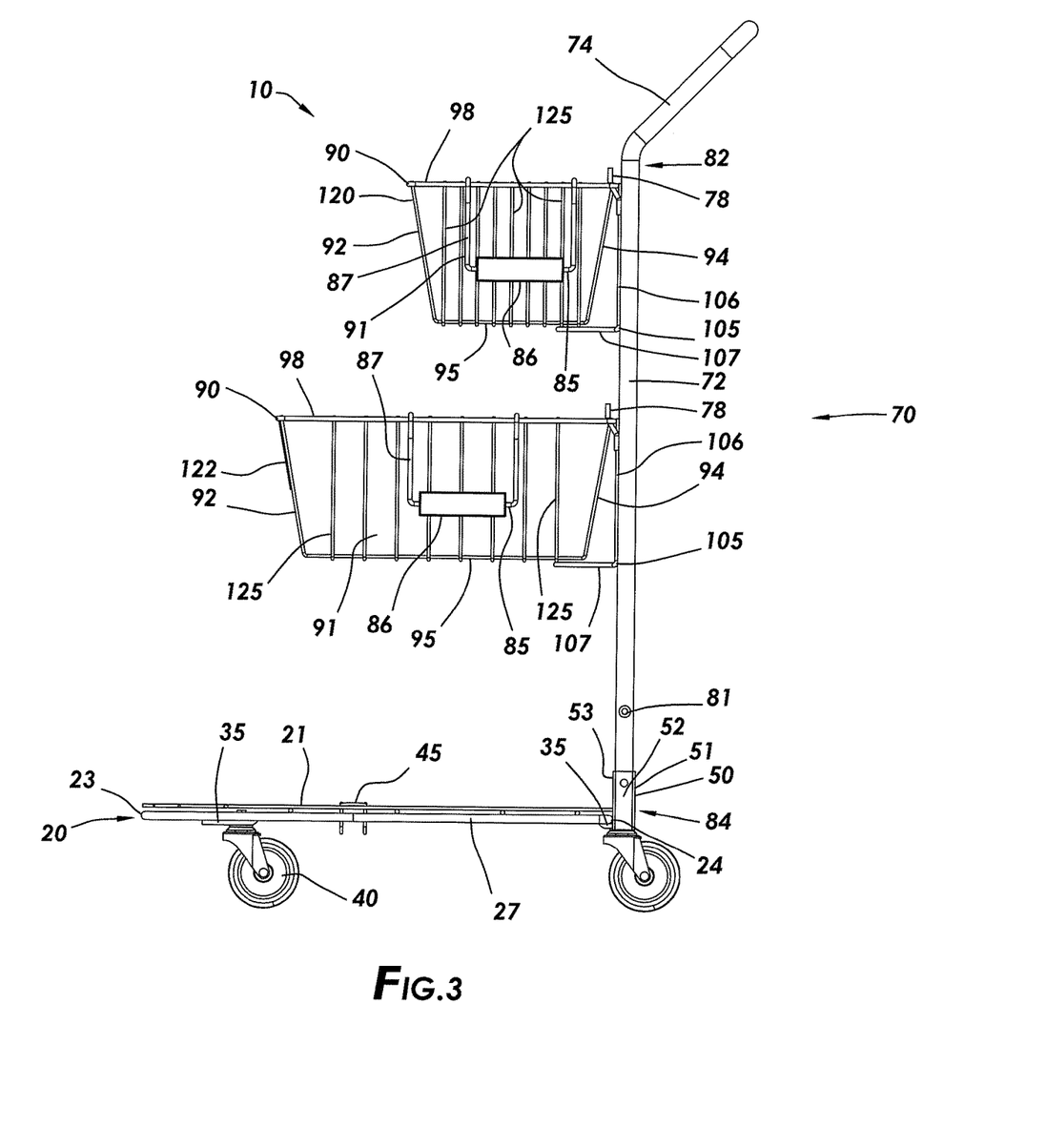
FIG. 3 is a side view of the preferred embodiment of the present invention.
Figure 4:
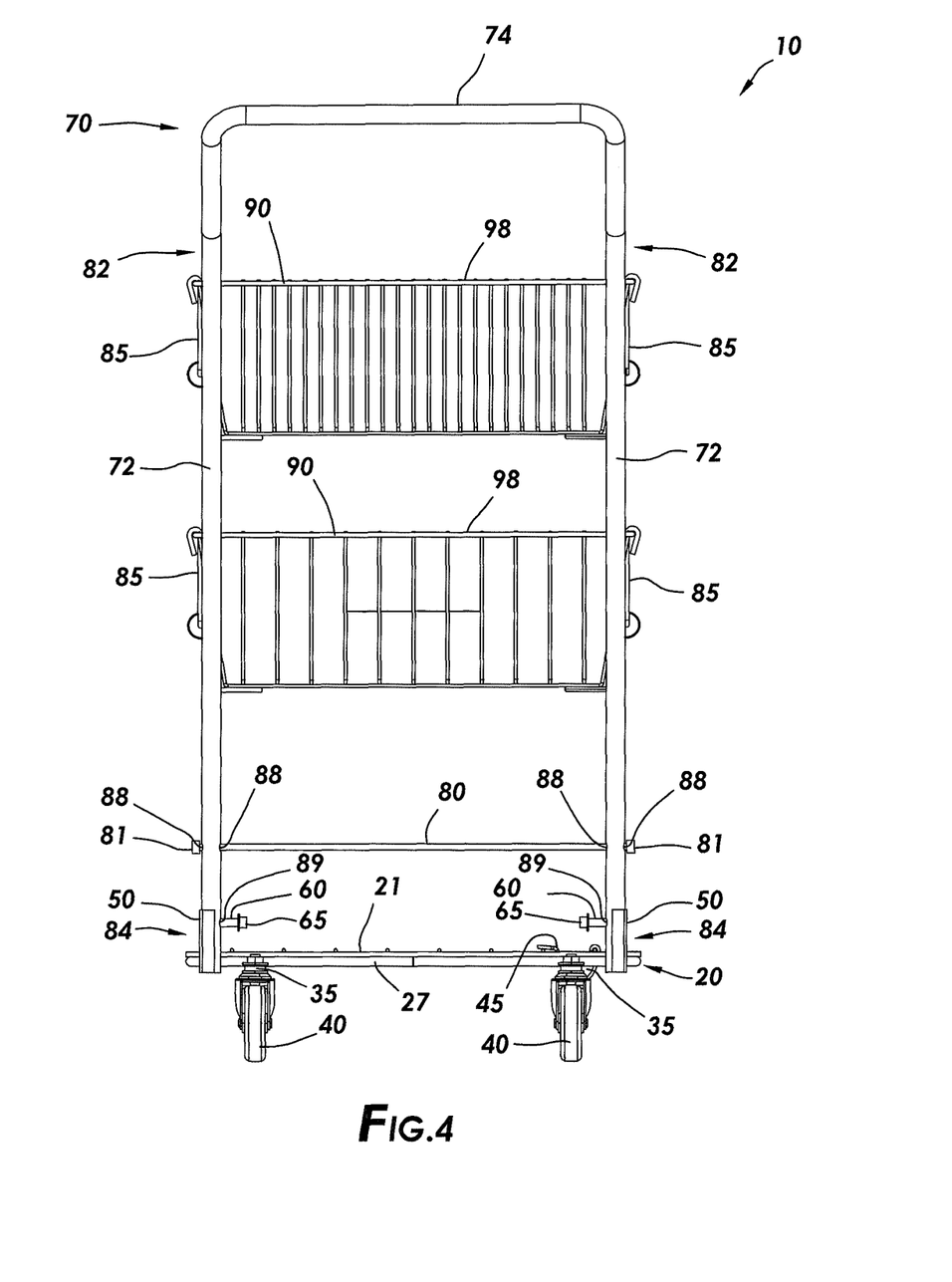
FIG. 4 is a back view of the preferred embodiment of the present invention.
Figure 5:
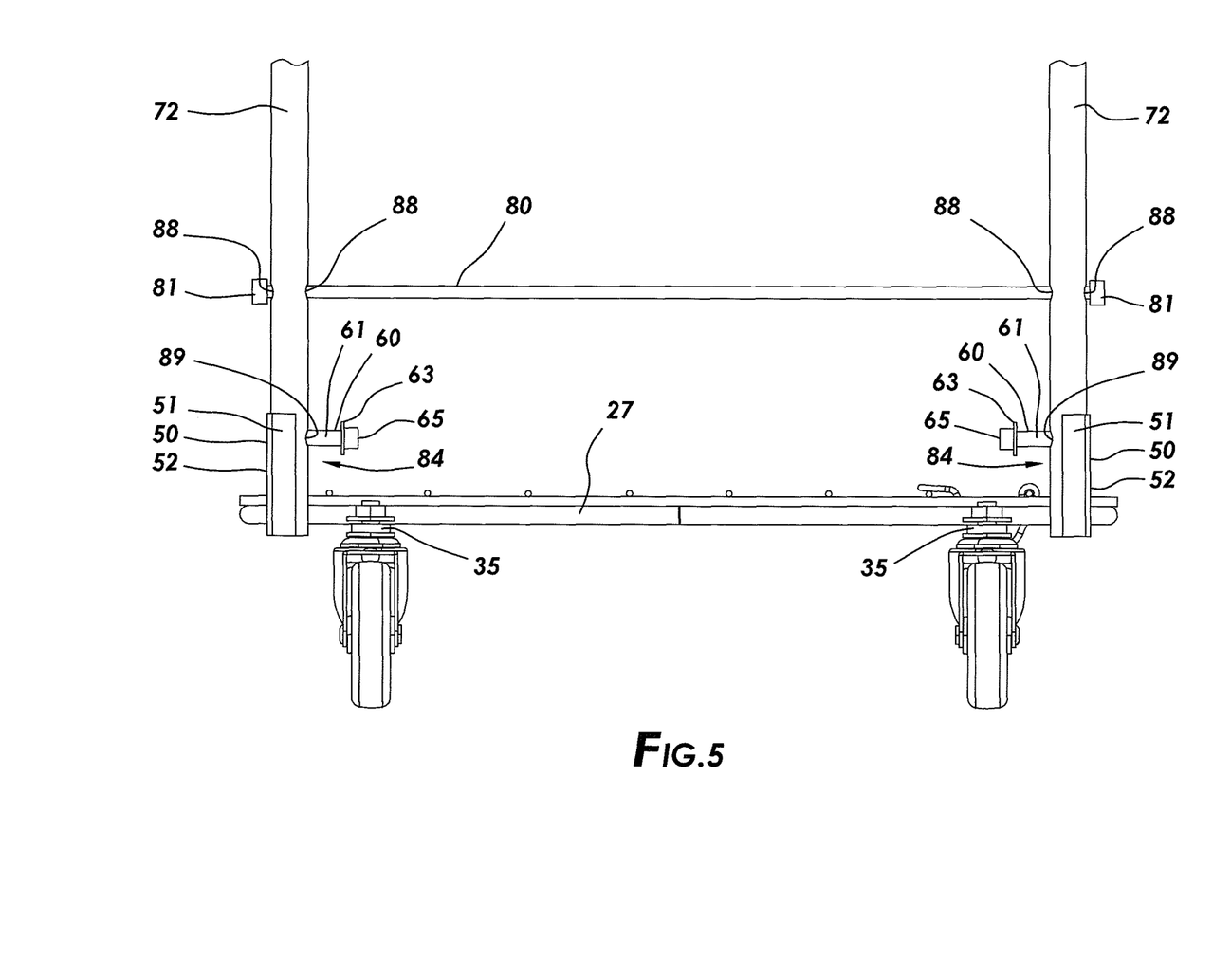
FIG. 5 is a close-up back view of the bottom end of the preferred embodiment of the present invention with the support beams of the present invention in a first position.

As shown in FIGS. 1-3, a plurality of basket mounting hooks 78 are mounted to the support beams 72 on the side of the support beams 72 facing the base panel 20. In the preferred embodiment, the upper ends of the basket mounting hooks 78 extend from the support beams to form a space between the basket mounting hooks 78 and the support beams 72 which acts as a hook to receive a top frame 98 of the basket 90. However, other shapes of basket mounting hooks are envisioned. Each basket 90 requires two basket mounting hooks 78 positioned on each support beam 72 at the same height such that the top frame 98 of the basket 90 will mount level across the support beams 72 when the basket 90 is mounted onto the basket mounting hooks 78. In the preferred embodiment, each support beam 72 contains two mounting hooks 78 such that two baskets 90 can mount to the basket support frame 70 when the collapsible cart 10 is in the upright position.

Support members 105 of the basket 90 are generally L-shaped rods consisting of a first arm 106 and a second arm 107 and are positioned behind the back wall 94 of the basket 90 with one support member 105 proximal to one side wall 91 and the other support member 105 proximal to the other side wall 91. The top end of the first arm 106 of each support member 105 is connected to the top frame 98 at positions proximal to each side wall 91. Preferably each first arm 106 extends downward from the top frame 98 at an angle such that the first arm 106 is positioned adjacent to the interior side of the basket mounting hook 78 when the basket 90 is mounted onto the basket support frame 70. In this manner, the first arm 106 of each support member 105 prevents the support beams 72 from sliding along the longitudinal axis of the hinge pins 60. The second arm 107 of each support member 105 extends from the bottom end of the first arm 106 and connects to the bottom side 95 of the basket 90.

Preferably, the connection of each first arm 106 to the basket's 90 top frame 98 and the connection of each second arm 107 to the basket's 90 bottom side 95 is made with welds. The support members 105 of the basket 90 are positioned such that when the basket 90 is mounted to the basket support frame 70 the first arm 106 of each support member 105 abuts against the support beams 72. In this manner, the support member 105 prevents the top frame 98 of the basket 90 from rotating on the basket mounting hooks 78 and the basket 90 remains upright with the top frame 98 and the bottom side 95 being generally parallel with the base panel 20.

Each basket 90 has two basket handles 85 positioned at each side wall 91 of the basket 90. Each basket handle 85 has a gripping member 86 which is mounted on a generally square U-shaped rod 87. The ends of each U-shaped rod 87 is hooked so as to hook around the top frame 98 above each side wall 91. In this manner, each basket handle 85 is rotatably mounted onto the top frame 98. The basket handles 85 allow users to remove the basket 90 from the basket support frame 70 and carry the removed basket 90.

In the preferred embodiment, there are two baskets 90 mounted onto the basket support frame 70 in the manner described above where an upper basket 120 is positioned above a lower basket 122. It is also anticipated that more than two baskets may be mounted on the basket support frame 70.

FIGS. 1-5, 7 show the support beams 72 in a first position in which the support beams 72 of the basket support frame 70 are in the upright position and parallel to each other and the second end 84 of each support beam 72 is positioned within the receiving space 55 of each hinge mount 50. When the support beams 72 are in the first position the hinge mounts 50, at least partially, surround the second end 84 of each support beam 72 such that rotation of each support beam 72 around the hinge pin 60 is prevented by the first wall 51 and second wall 52 of the hinge mounts 50.

As shown in FIGS. 1-6, 8, a cable 80 is made of a flexible material and has a length that is slightly longer than the distance between the two support beams 72 including the diameter of both support beams 72. The cable 80 mounts to the two support beams 72 by positioning the ends of the cable 80 through the two cable openings 88 of each of the support beams 72. A head 81 is secured to both ends of the cable 80. The diameter of each of the heads 81 is slightly larger than the diameter of the cable openings 88 such that the heads 81 keeps the cable 80 secured to the support beams 72 by keeping the cable 80 from sliding out of the cable openings 88.

Figure 6:
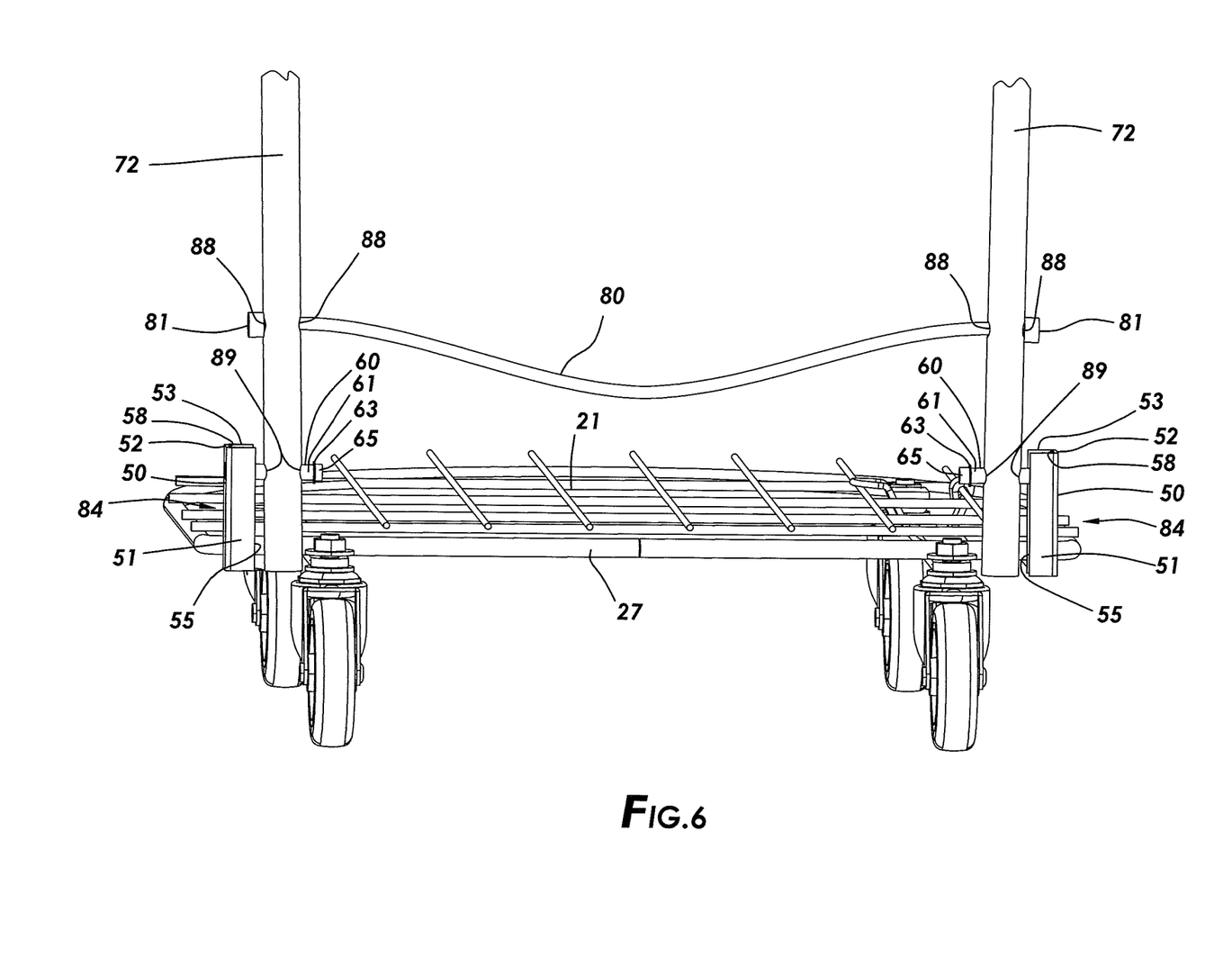
FIG. 6 is a close-up back view of the bottom end of the preferred embodiment of the present invention with the support beams of the present invention in a second position.
Figure 7A:
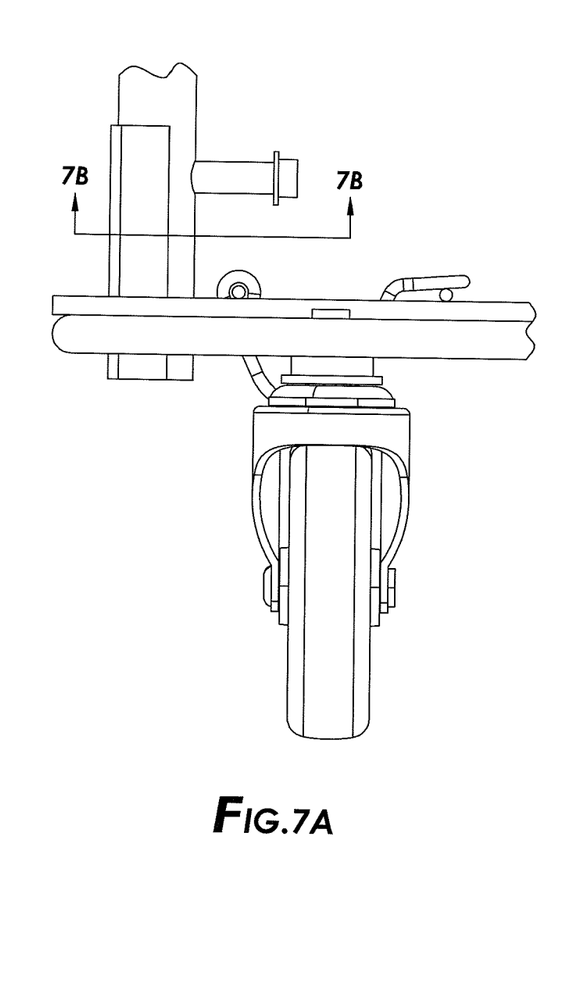
FIG. 7A is a close-up front view of the bottom left end of the preferred embodiment of the present invention with the second end of a support beam positioned within the receiving space of a hinge mount when the support beam is in the first position.
Figure 7B:
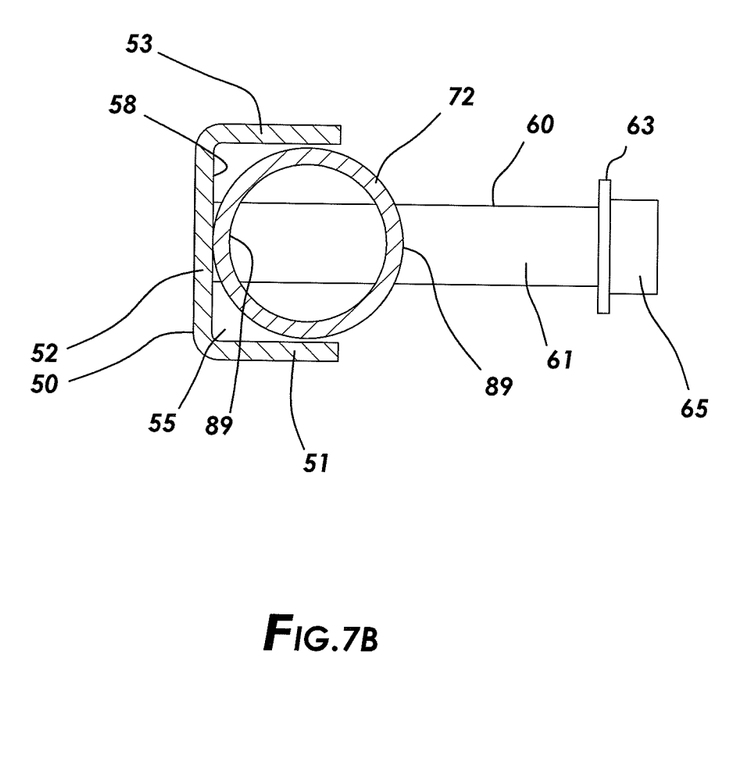
FIG. 7B is a close-up sectional view along section line 7B of FIG. 7A.

As shown in FIG. 6, when a downward or upward force is exerted on the cable 80 of the basket support frame 70, each end of the cable 80 pulls the second ends 84 of the support beams 72 along the longitudinal axis of the hinge pins 60 away from the second wall 52 of the hinge mounts 50 and towards the caps 65 of the hinge pins 60 which causes the second end 84 of the support beams 72 to move outside and clear of the receiving space 55 and into a second position. Preferably, for ease of movement of the support beams 72, the brackets 90 would be removed prior to moving the support beams 72 into the second position. The lips 63 of the caps 65 of the hinge pins 60 block the support beams 72 from sliding off the hinge pins 60. When the support beams 72 are in the second position, the second end 84 of each support beam 72 can extend below the back end 24 of the outer perimeter frame 27 of the base panel 20 which restricts the rotational movement of the basket support frame 70 such that the cart handle 74 of the basket support frame 70 is blocked from rotating in a direction away from the base frame 20 but is allowed to rotate in a direction towards the base frame 20.

Figure 8:
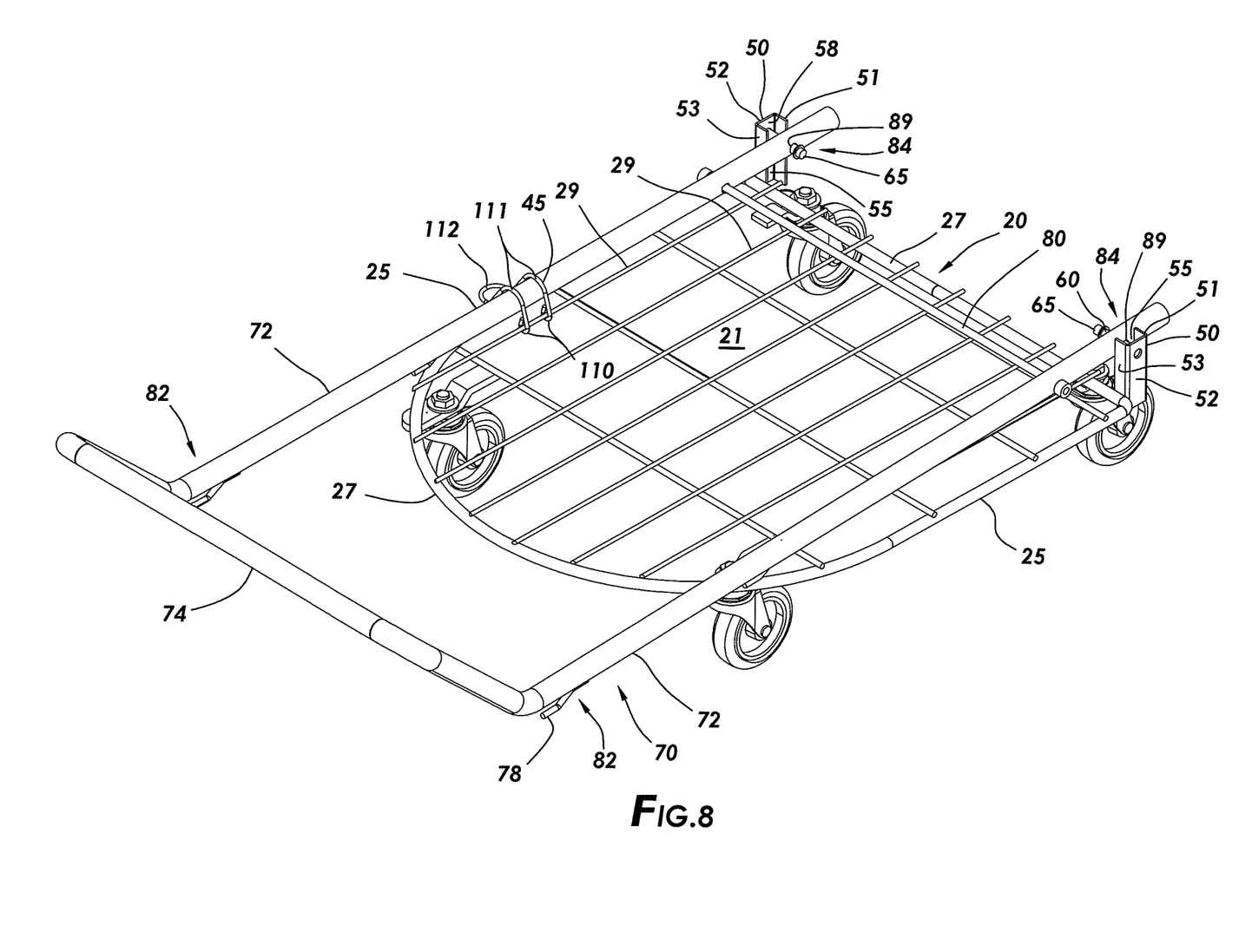
FIG. 8 is a perspective view of the preferred embodiment of the present invention in the collapsed position.

When the support beams 72 are in the second position, and the baskets 90 removed, the basket support frame 70 may rotate around the hinge pins 60 in a plane that is perpendicular to the longitudinal axis of the hinge pins 60 towards the base surface 21 of the base panel 20 and into a collapsed position, as shown in FIG. 8. When the bracket support frame 70 is in the collapsed position, the support beams 72 are positioned adjacent to, above and generally parallel to the base surface 21 of the base panel 20.

Figure 9:
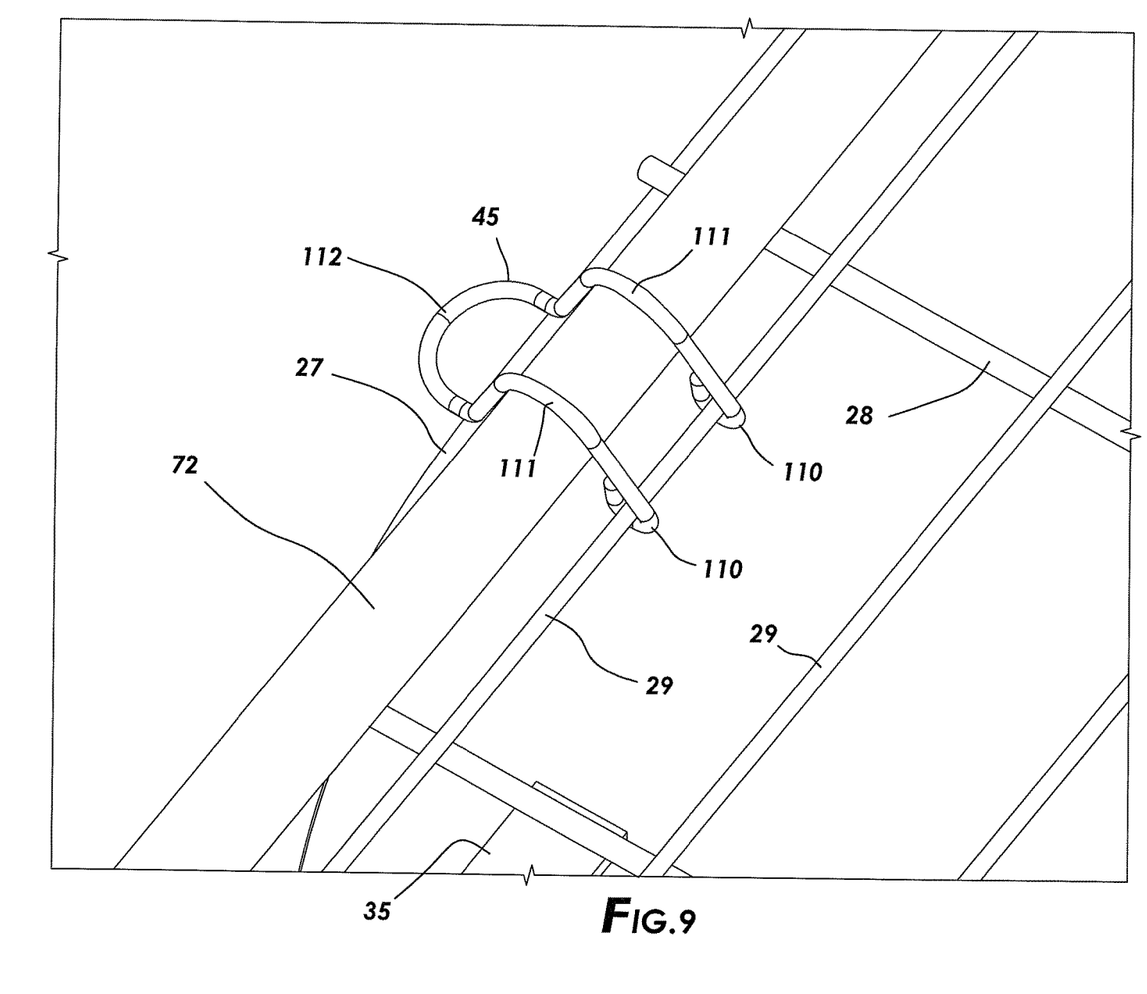
FIG. 9 is a close-up view of the latch of the preferred embodiment of the present invention in the locked position.

As seen in FIGS. 8 and 9, a latch 45 can secure the basket support frame 70 in the collapsed position. In the preferred embodiment, the latch 45 is a simple cam latch with a first end 110 rotatably secured to a rod 29 positioned across the depth of the base panel 20 and second end 112 extending across an adjacent rod 29 also positioned across the depth of the base panel 20 such that the second end 112 of the latch 45 can rest on the adjacent rod 29. A middle portion 111 of the latch 45 is shaped to receive and correspond with the shape of the support beam 72 of the basket support frame 70. The latch 45 is positioned on the base panel 20 such that when the latch 45 is rotated, the middle portion 111 of the latch 45 can cam over and receive one of the support beams 72. The length of the latch 45 is generally longer than the distance between adjacent rods 29 such that the second end 112 of the latch 45 restricts the rotational movement of the latch 45 to generally 180 degrees. When the basket support frame 70 is in the collapsed position the latch 45 rotates from an unlocked position where the second end 112 rests on an adjacent rod 29, as seen in FIG. 1, to a locked position where the latch 45 locks against a support beam 72 and secures the basket support frame 70 in the collapsed position adjacent the base panel 20, as seen in FIGS. 8 and 9. When the latch 45 rotates from the locked position into the unlocked position, the basket support frame 70 may rotate from the collapsed position to the upright position, and allows the second end 84 of the support beams 72 to move from the second position into the first position such that the basket support frame 70 is locked into the upright position. When the basket support frame 70 is in the upright position the basket 90 can mount onto the basket mounting hooks 78 of the basket support frame 70.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above-description of the invention. It is, therefore, contemplated that the appended claims will cover such modifications that fall within the scope of the invention.

I claim:

1. A collapsible cart comprising:
a base panel having an outer perimeter frame and a base surface;
first and second hinge mounts extending from base panel;
first and second hinge pins wherein said first hinge pin is connected to said first hinge mount and said second hinge pin is connected to said second hinge mount;
and wherein said hinge mounts are U-shaped members comprising of a first wall, a second wall, and a third wall;
a basket support frame comprising first and second support beams;
wherein said first support beam is slidably and rotatably mounted to said first hinge pin and said second support beam is slidably and rotatably mounted to said second hinge pin;
wherein said basket support frame can rotate between a collapsed position and an upright position;
wherein said first and second support beams are lockable in an upright position;
at least one basket mountable on said first and second support beams; and
wherein said basket is comprised of at least one support member.

2. The collapsible cart of claim 1 further comprising at least three wheels attached to said base panel.

3. A collapsible cart comprising:
a base panel having an outer perimeter frame and a base surface;
first and second hinge mounts extending from base panel;
and wherein said hinge mounts are U-shaped members comprising of a first wall, a second wall, and a third wall;
first and second hinge pins wherein said first hinge pin is connected to said first hinge mount and said second hinge pin is connected to said second hinge mount;
a basket support frame comprising first and second support beams;
wherein said first support beam is slidably and rotatably mounted to said first hinge pin and said second support beam is slidably and rotatably mounted to said second hinge pin;
wherein said basket support frame can rotate between a collapsed position and an upright position;
wherein said first and second support beams are slidable along the longitudinal axis of said first and second hinge pins between a first position and second position;
wherein when said first and second support beams are in the first position said first and second support beams are locked in an upright position and when said first and second support beams are in said second position said first and second support beams are capable of rotating around said first and second hinge pins;
a flexible cable connected between said first and second support beams, wherein applying tension to said cable displaces each of said first and second support beams from said first position into said second position;
at least one basket member mountable on said first and second support beams; and
wherein said basket member is comprised of at least one support member.

4. The collapsible cart of claim 3 wherein said first and second hinge mounts can block rotation of said first and second support beams around said first and second hinge pins when said first and second support beams are in said first position.

5. The collapsible cart of claim 3 wherein said basket member can prevent movement of said first and second support beams along the longitudinal axis of said first and second hinge pins when said first and second support beams are in said first position and said at least one basket member is mounted on said first and second support beams.

6. The collapsible cart of claim 3 wherein said base panel can block rotation of said first and second support beams in one direction.

7. The collapsible cart of claim 3 wherein when said basket support frame is rotated to a collapsed positioned said first and second support beams are positioned above and generally parallel to said base surface.

8. The collapsible cart of claim 7 further comprising at least one latch wherein said latch is capable of locking said basket support fame in said collapsed position.

9. The collapsible cart of claim 3 wherein said basket support frame further comprises a handle.

10. The collapsible cart of claim 3 further comprising a basket handle connected to said at least one basket member.

11. The collapsible cart of claim 3 further comprising a plurality of mounting hooks attached to said first and second support beams for mounting said at least one basket member on said first and second support beams.

12. The collapsible cart of claim 3 further comprising at least three wheels attached to said base panel.

13. The collapsible cart of claim 1 further comprising a plurality of mounting hooks attached to said first and second support beams for mounting said at least one basket on said first and second support beams.

14. The collapsible cart of claim 1 wherein said first support beam is slidable along the longitudinal axis of said first hinge pin and said second support beam is slidable along the longitudinal axis of said second hinge pin.

15. The collapsible cart of claim 14 wherein said first and second hinge mounts can block rotation of said first and second support beams around said first and second hinge pins when said first and second support beams are in a first position on said first and second hinge pins.

16. The collapsible cart of claim 15 further comprising:

a flexible cable connected between said first and second support beams; and wherein movement of said cable can cause said first and second support beams to move along the longitudinal axis of said first and second hinge pins into a second position on said first and second hinge pins wherein rotation of said first and second support beams around said first and second hinge pins is allowed.

17. The collapsible cart of claim 16 wherein said at least one basket can be positioned to prevent movement of said first and second support beams along the longitudinal axis of said first and second hinge pins between said first position and said second position.

18. The collapsible cart of claim 1 wherein said base frame can block rotation of said first and second support beams in one direction.

19. The collapsible cart of claim 1 wherein when said basket support frame is rotated to a collapsed positioned said first and second support beams are positioned above and generally parallel to said base surface.

20. The collapsible cart of claim 19 further comprising at least one latch wherein said latch is capable of locking said basket support frame in said collapsed position.

21. The collapsible cart of claim 1 wherein said basket support frame further comprises a handle.

22. The collapsible cart of claim 1 further comprising a basket handle connected to said at least one basket.

* * * * *